(12) United States Patent
Schmitt et al.

(10) Patent No.: US 11,867,622 B2
(45) Date of Patent: Jan. 9, 2024

(54) PROCESS ANALYZER ADAPTER

(71) Applicant: ABB Schweiz AG, Baden (CH)

(72) Inventors: Johannes Schmitt, Friedrichsdorf (DE); Peter Weil, Rockenberg (DE); Jens Kubatta, Jena (DE); Daniel Voss, Frankfurt am Main (DE); Benjamin Buengel, Kronberg (DE)

(73) Assignee: ABB Schweiz AG, Baden (CH)

( * ) Notice: Subject to any disclaimer, the term of this patent is extended or adjusted under 35 U.S.C. 154(b) by 536 days.

(21) Appl. No.: 16/920,444

(22) Filed: Jul. 3, 2020

(65) Prior Publication Data
US 2021/0010933 A1 Jan. 14, 2021

(30) Foreign Application Priority Data
Jul. 8, 2019 (EP) .................................. 19184983

(51) Int. Cl.
*F16L 23/18* (2006.01)
*G01N 21/39* (2006.01)
*F16L 27/08* (2006.01)

(52) U.S. Cl.
CPC .............. *G01N 21/39* (2013.01); *F16L 23/18* (2013.01); *F16L 27/0804* (2013.01)

(58) Field of Classification Search
CPC ... H01J 49/0422; F16L 23/18; F16L 27/0804; F16L 27/04; F16L 27/047; F16L 27/06; F16L 27/0853; G02B 7/003
See application file for complete search history.

(56) References Cited

U.S. PATENT DOCUMENTS

| 826,454 | A | * | 7/1906 | Timmer | F16L 27/053 |
| | | | | | 285/94 |
| 1,202,502 | A | * | 10/1916 | Forth | F16L 27/053 |
| | | | | | 285/368 |
| 2,943,130 | A | * | 6/1960 | Lindner | H05B 3/0014 |
| | | | | | 373/134 |
| 3,424,413 | A | * | 1/1969 | Applegate | B23Q 1/545 |
| | | | | | 248/661 |
| 3,477,748 | A | * | 11/1969 | Tinsley | E21B 33/08 |
| | | | | | 285/267 |
| 5,847,885 | A | * | 12/1998 | Arnone | G02B 7/003 |
| | | | | | 359/822 |
| 6,198,580 | B1 | * | 3/2001 | Dallakian | G02B 7/1824 |
| | | | | | 359/813 |

(Continued)

FOREIGN PATENT DOCUMENTS

| DE | 10328089 A1 * | 1/2005 | ............. G01D 11/30 |
| DE | 102019100443 A1 * | 7/2020 | ............. F16L 23/003 |

(Continued)

*Primary Examiner* — Zachary T Dragicevich
*Assistant Examiner* — James A Linford
(74) *Attorney, Agent, or Firm* — Leydig, Voit & Mayer, Ltd.

(57) ABSTRACT

A process analyzer adapter includes: a first part connectable to a process analyzer, the first part being rotatable about a first axis; a second part; and a third part. The first part is rotationally connected to the second part. The second part is rotationally connected to the third part. The second part is rotatable about a second axis, rotation of the second part about the second axis tilting the first axis. The third part is connectable to a flange of an industrial process equipment.

13 Claims, 3 Drawing Sheets

(56) References Cited

U.S. PATENT DOCUMENTS

| | | | |
|---|---|---|---|
| 9,116,259 B2* | 8/2015 | Zhu | G02B 7/00 |
| 2003/0047660 A1* | 3/2003 | Gaunt | G02B 7/1825 |
| | | | 248/483 |

FOREIGN PATENT DOCUMENTS

| | | | | | |
|---|---|---|---|---|---|
| EP | 2982948 | A2 | 2/2016 | | |
| FR | 1236037 | A * | 7/1960 | | |
| GB | 190922253 | A * | 9/1910 | | |
| WO | WO-2009121512 | A1 * | 10/2009 | ............ | F16L 27/026 |
| WO | WO-2017002800 | A1 * | 1/2017 | | |
| WO | WO-2020144153 | A1 * | 7/2020 | ............ | F16L 23/003 |

* cited by examiner

PROCESS ANALYZER ADAPTER

CROSS-REFERENCE TO PRIOR APPLICATION

Priority is claimed to European Patent Application No. EP 19 184 983.5, filed on Jul. 8, 2019, the entire disclosure of which is hereby incorporated by reference herein.

FIELD

The present invention relates to a process analyzer adapter.

BACKGROUND

Field measurement instruments (such as for example the ABB Laser-Gas Analyzation System LS4000), also here called analyzers, are positioned in-situ and connected to a process with a flange. These systems need to be aligned. Furthermore, the connection of the analyzer to the flange needs to be gas tight in every alignment position.

One currently available system combines the sealing and the alignment function by using a flexible sealing element and numerous adjustment screws. For example, some systems have a total of 8 alignment screws that have to be considered and aligned, whilst maintaining a gas tight seal. However, an O-ring seal can be compressed on one side more than the other in certain alignment positions, leading to a loss of the gas tight seal in certain alignments. Also, can be difficult to align the system even when gas tight due to the number of alignment screws that need to be considered.

Another currently available system (from Siemens) uses a completely sealed flange part with a window in it for connection to the process. This has an advantage that the moving part, for alignment, does not have to be gas tight but the disadvantage is that there is a loss of transmission from the optical measurement system to the process.

Another currently available system (from Yokogawa) uses a welded steel bellows to achieve a gas tight system and allow movement, however this is not an optimum solution.

There is a need to provide for an improved gas tight connection between a field instrument or analyzer and a flange of a process.

Therefore, it would be advantageous to have an improved gas tight connection between a field instrument or analyzer and a flange of a process.

SUMMARY

In an embodiment, the present invention provides a process analyzer adapter, comprising: a first part configured to connect to a process analyzer, the first part being rotatable about a first axis; a second part; and a third part, wherein the first part is rotationally connected to the second part, wherein the second part is rotationally connected to the third part, wherein the second part is rotatable about a second axis, rotation of the second part about the second axis being configured to tilt the first axis, and wherein the third part is configured to connect to a flange of an industrial process equipment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an aspect, there is provided a process analyzer adapter, comprising:
a first part;
a second part; and
a third part.

The first part is configured to connect to a process analyzer. The first part is rotationally connected to the second part, wherein the first part can rotate about a first axis. The second part is rotationally connected to the third part, wherein the second part can rotate about a second axis. Rotation of the second part about the second axis is configured to tilt the first axis. The third part is configured to connect to a flange of an industrial process equipment.

In an example, the first axis is orthogonal to the second axis.

In an example, the first axis and second axis intersect at an intersection point.

In an example, a seal is provided between the first part and the third part.

In an example, a spherically shaped outer portion of the first part has a radius of curvature centered on the intersection point.

In an example, the seal is a seal of the third part configured to contact the spherically shaped outer portion of the first part when the first part rotates about the first axis and/or when the second part rotates about the second axis.

In an example, the seal comprises an O-ring located within the third part.

In an example, the O-ring sits in a triangular shaped groove in the third part.

In an example, a spherically shaped outer portion of the third part has a radius of curvature centered on the intersection point.

In an example, the seal is a seal of the first part configured to contact the spherically shaped outer portion of the third part when the first part rotates about the first axis and/or when the second part rotates about the second axis.

In an example, the seal is an O-ring located within the first part.

In an example, the O-ring sits in a triangular shaped groove in the first part.

In an example, the adapter further comprises at least one alignment screw configured to rotate the first part about the first axis and/or rotate the second part about the second axis.

Figure 1:
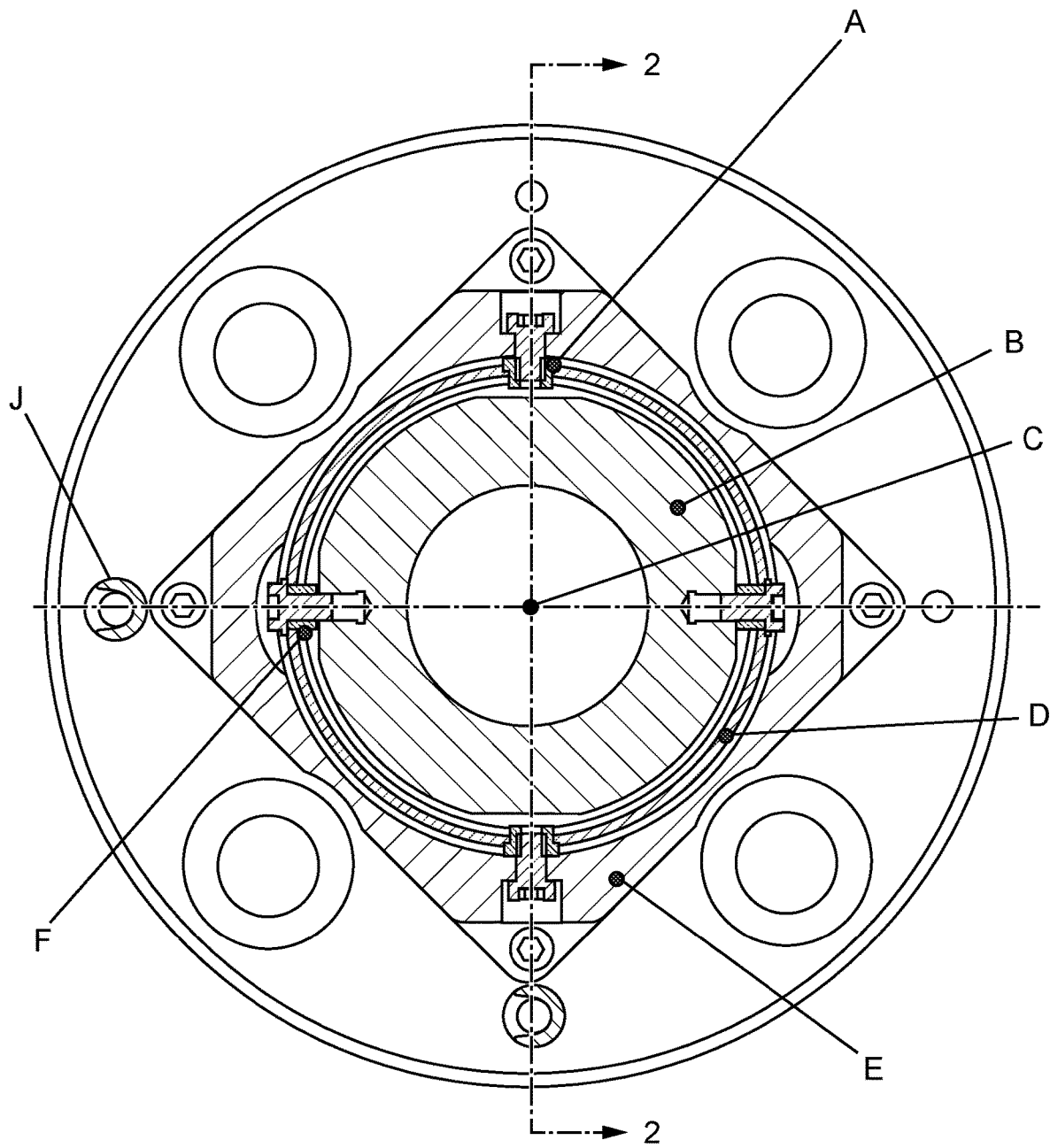
FIG. 1 shows a cross-section through an example of a process analyzer adapter.
Figure 2:
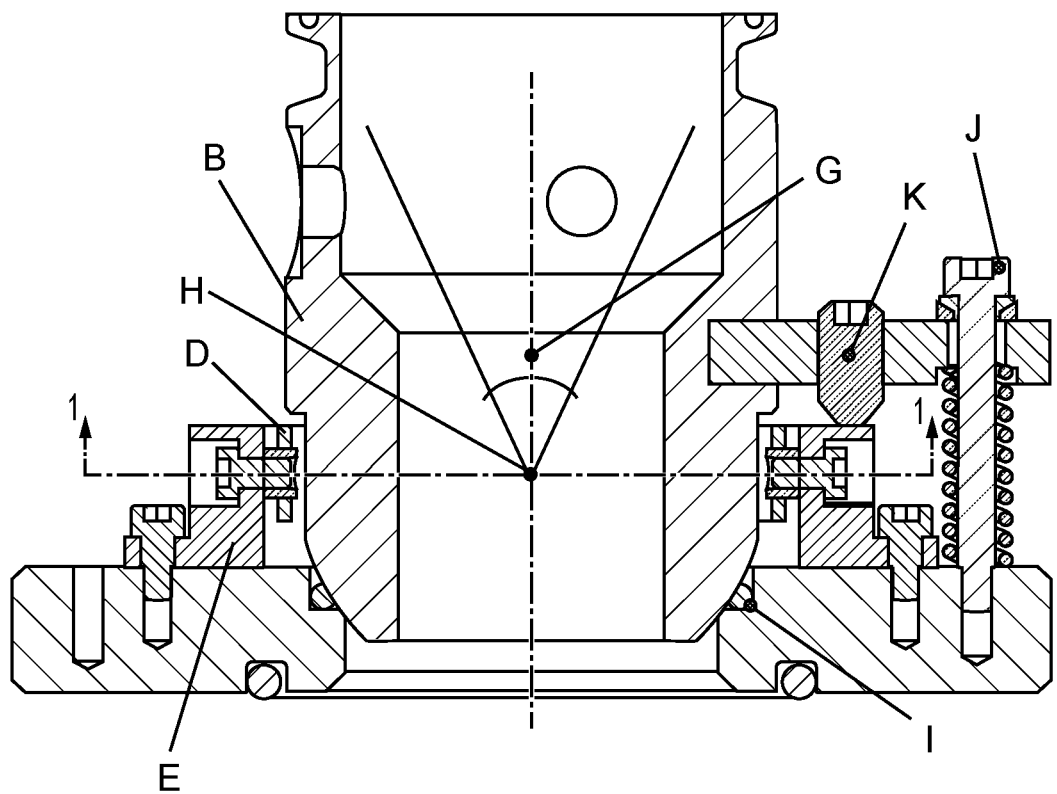
FIG. 2 shows a cross-section through the process analyzer adapter shown in FIG. 1.
Figure 3A:
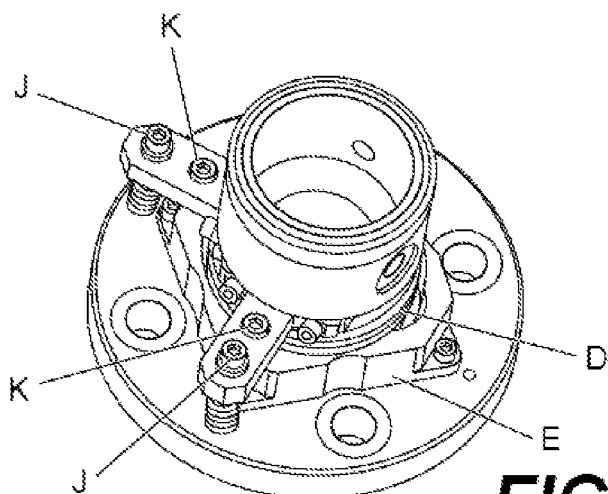
FIGS. 3A-3C show three dimensional representations of the process analyzer adapter of FIGS. 1-2.
Figure 3B:
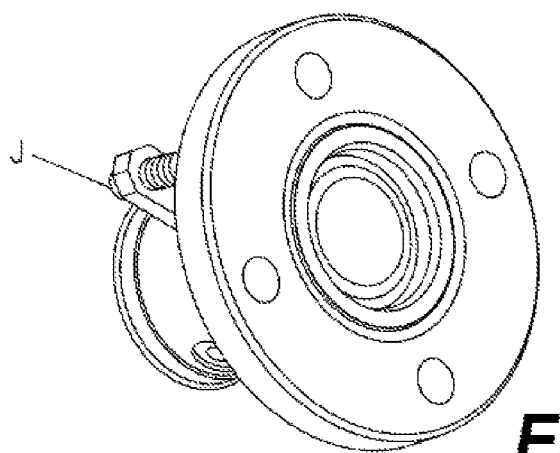
Figure 3C:
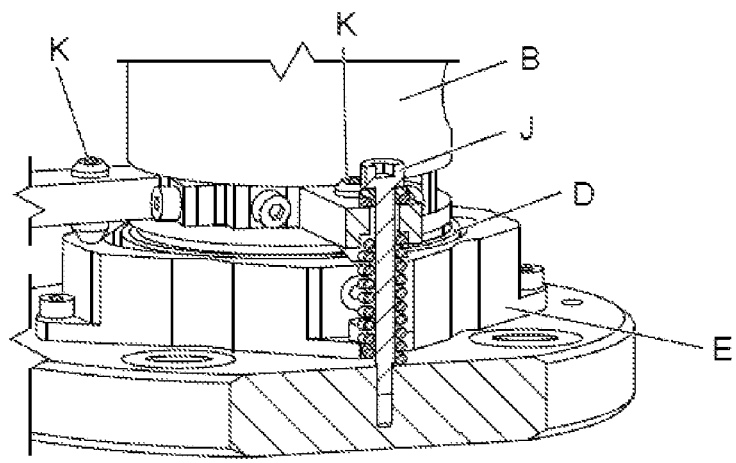

FIGS. 1-3 relate to an example of a process analyzer adapter. In an example, the process analyzer adapter comprises a first part, a second part, and a third part. The first part is configured to connect to a process analyzer. The first part is rotationally connected to the second part. With respect to the rotational connection with the second part the first part can rotate about a first axis. The second part is rotationally connected to the third part. With respect to the rotational connection with the third part, the second part can rotate about a second axis. Thus, rotation of the second part about the second axis is configured also to tilt the first part with the first axis also tilting. The third part is configured to connect to a flange of an industrial process equipment.

According to an example, the first axis is orthogonal to the second axis.

According to an example, the first axis and second axis intersect at an intersection point.

According to an example, a seal is provided between the first part and the third part.

In an example, the seal provides an air tight or gas tight seal between the first part and the third part, that is maintained during rotation of the first part about the first axis and/or rotation of the second part about the second axis.

According to an example, a spherically shaped outer portion of the first part has a radius of curvature centered on the intersection point.

According to an example, the seal is a seal of the third part configured to contact the spherically shaped outer portion of the first part when the first part rotates about the first axis and/or when the second part rotates about the second axis.

According to an example, the seal comprises an O-ring located within the third part.

According to an example, the O-ring sits in a triangular shaped groove in the third part.

However, rather than have the first part that has a spherical surface that is sealed against a seal of the third part, these features can be reversed. Thus, according to an example, a spherically shaped outer portion of the third part has a radius of curvature centered on the intersection point.

According to an example, the seal is a seal of the first part configured to contact the spherically shaped outer portion of the third part when the first part rotates about the first axis and/or when the second part rotates about the second axis.

According to an example, the seal is an O-ring located within the first part.

According to an example, the O-ring sits in a triangular shaped groove in the first part.

According to an example, the adapter comprises at least one alignment screw configured to rotate the first part about the first axis and/or rotate the second part about the second axis.

The inventors realized that a gyrocompass gimbal system, where a compass is mounted within two concentric rings, with the compass being able to rotate about a first axis with respect to an inner ring, and the inner ring able to rotate about a second axis with respect to the outer ring could be utilized in a modified manner in order to provide a gas tight seal for an analyzer or field instrument, whilst at the same time enabling alignment adjustment of the analyzer without compromising the gas tight seal. Thus, the new adapter (or mount) features two independently movable axes, where the gas tight seal is invariant to any alignment change. Thus, the adapter has independent movable axes and is gas tight in every position. This makes alignment intuitive, fast an easy. The whole adapter or mount consists of a non-movable flange that connects to the process side and a movable part connecting to the analyzer. The combination of the modified gyrocompass principle and a spherical geometry with rotation about a common center, whilst utilizing a triangular sealing groove to seal the moving part from the fixed parts provides for a completely new and improved way of mounting analyzers and field instruments to process apparatus or systems.

Continuing with the figures, the process analyzer adapter is described in further detail, with respect to a specific embodiment.

FIG. 1 shows a horizontal cross section through the process analyzer adapter as indicated by horizontal sectional line 1-1 in FIG. 2. A pivoted connection ring is shown at "A". An analyzer mount (also called a first part), to which the analyzer is connected, is shown at "B". "C" indicates the center of spherical geometry and the intersection point of both axes. A ring element (also called a second part) is shown at "D", and the analyzer mount B can rotate about an axis with respect to the ring element D shown at "F". A non-moving flange (also called a third part) is shown at "E", and the ring element D can rotate about a second axis with respect to this nonmoving flange E, and where the second axis is angled to the first axis. The non-moving flange E is used to connect to a process vessel, apparatus or system.

FIG. 2 shows a vertical cross-section for the process analyzer adapter as shown in FIG. 1 along the vertical dashed line in FIG. 1. The analyzer mount B described with respect to FIG. 1 is here the center element extending upwards. Represented at "G" is an angle of alignment for the analyzer, which can be different for either axis of rotation depending upon the specific implementation required. The two axes of rotation described above with respect to FIG. 1 intersect at point "H" and forms a center of rotation of the analyzer mount B. Shown in a specific embodiment of FIG. 2 the analyzer mount B has a flat bottom and adjacent to the bottom is a spherical surface, shown being mated with an O-ring seal within a triangular shaped sealing groove indicated at "I". The radius of curvature of this spherical part of the analyzer mount B is also centered on the center of rotation H, and in this way as the analyzer mount B rotates about the two axes, either due to rotational movement of the analyzer mount B with respect to the ring element D and/or with respect to rotational movement of the ring element D with respect to the non-moving flange E, the distance between this spherical surface and the O-ring I does not change. Thus, the integrity of the gas tight or airtight seal is maintained. Shown at "J" is a spring-loaded screw with a spherical disc, and a socket angle compensation, and shown at "K" is a set screw to lock the alignment.

FIG. 3 FIGS. 3A-3C then show three isometric views of the process analyzer adapter.

Thus, the new process analyzer adapter allows the inner part to rotate freely around two orthogonal axes. Using this principle, the moving part (the "analyzer mount" or first part B) of the flange E is held in place using a ring-shaped element D (the second part) that is connected to the analyzer mount B in a way that it can rotate around one axis. Due to the design of the analyzer mount B it cannot rotate freely around that axis. The angular movement depends on the specific design, and can for example be varied if required. This ring-shaped element D is then mounted to an outer part (the non-moving flange or third part E) in a way that it can rotate around an orthogonal axis. It can also be mounted to rotate around a non-orthogonal axis if desired. Rather than this third part E being a non-movable flange itself, it can be a separate part that is fixedly mounted to the nonmoving flange part. This allows the analyzer mount B to rotate around two (in this particular embodiment) orthogonal axes at the same time. Sealing is archived by using the principle of a triangular shaped O-Ring groove I. An O-Ring sits inside an accordingly shaped area of the flange E. The mating surface is not flat (as it is in a classical triangular shaped O-Ring sealing) but spherical with a larger radius. The contact area between this shape and the O-Ring can be assumed as "flat" as it is only a small section of that sphere. This sphere is part of the analyzer mount B and the center point of it aligns with the intersection point H of the two orthogonal axis. Using the right geometry, the O-Ring is compressed as desired to fulfill its purpose. As the center point of the sphere and the intersection point H of the axes are at the same spot, the O-Ring pressure stays the same no matter how much the analyzer mount B is rotated (within a certain limit due to the geometry of the complete design). To allow alignment there is one spring-loaded screw J and a smaller set screw K to lock the alignment attached to the analyzer mount B per axis (up to 4 are possible but not needed). It is to be noted that rather than use an O-ring seal, a different sealing functionality can be archived using a membrane-like seal which is connected to the analyzer mount B and the non-moving flange E.

Additionally, it is clear that a similar embodiment is possible, where the O-ring is located in the analyzer mount or first part, and the non-moving flange has a spherical surface that mates with the O-ring seal, where again that spherical surface has a radius centered on the center of rotation as discussed above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A process analyzer adapter, comprising:
a first part configured to connect to a process analyzer, the first part being rotatable about a first axis;
a second part; and
a third part,
wherein the first part is rotationally connected to the second part by at least one alignment screw,
wherein the second part is rotationally connected to the third part by at least one alignment screw,
wherein the second part is rotatable about a second axis, rotation of the second part about the second axis being configured to tilt the first axis,
wherein the third part is configured to connect to a flange of an industrial process equipment, and
wherein the first axis is orthogonal to the second axis.

2. The adapter according to claim 1, wherein the first axis and second axis intersect at an intersection point.

3. The adapter according to claim 2, wherein a seal is provided between the first part and the third part.

4. The adapter according to claim 3, wherein a spherically shaped outer portion of the first part has a radius of curvature centered on the intersection point.

5. The adapter according to claim 4, wherein the seal comprises a seal of the third part configured to contact the spherically shaped outer portion of the first part when the first part rotates about the first axis and/or when the second part rotates about the second axis.

6. The adapter according to claim 5, wherein the seal comprises an O-ring located within the third part.

7. The adapter according to claim 6, wherein the O-ring sits in a triangular shaped groove in the third part.

8. The adapter according to claim 3, wherein a spherically shaped outer portion of the third part has a radius of curvature centered on the intersection point.

9. The adapter according to claim 8, wherein the seal comprises a seal of the first part configured to contact the spherically shaped outer portion of the third part when the first part rotates about the first axis and/or when the second part rotates about the second axis.

10. The adapter according to claim 9, wherein the seal comprises an O-ring located within the first part.

11. The adapter according to claim 10, wherein the O-ring sits in a triangular shaped groove in the first part.

12. A process analyzer adapter, comprising:
a first part configured to connect to a process analyzer, the first part being rotatable about a first axis;
a second part; and
a third part,
wherein the first part is rotationally connected to the second part by at least one alignment screw,
wherein the second part is rotationally connected to the third part by at least one alignment screw,
wherein the second part is rotatable about a second axis, rotation of the second part about the second axis being configured to tilt the first axis,
wherein the third part is configured to connect to a flange of an industrial process equipment,
wherein the first axis and second axis intersect at an intersection point,
wherein a seal is provided between the first part and the third part, and
wherein a spherically shaped outer portion of the first part has a radius of curvature centered on the intersection point.

13. A process analyzer adapter, comprising:
a first part configured to connect to a process analyzer, the first part being rotatable about a first axis;
a second part; and
a third part,
wherein the first part is rotationally connected to the second part by at least one alignment screw,
wherein the second part is rotationally connected to the third part by at least one alignment screw,
wherein the second part is rotatable about a second axis, rotation of the second part about the second axis being configured to tilt the first axis,
wherein the third part is configured to connect to a flange of an industrial process equipment,
wherein the first axis and second axis intersect at an intersection point,
wherein a seal is provided between the first part and the third part, and
wherein a spherically shaped outer portion of the third part has a radius of curvature centered on the intersection point.

* * * * *